United States Patent
Lee et al.

(10) Patent No.: US 7,343,002 B1
(45) Date of Patent: Mar. 11, 2008

(54) BEARING ASSEMBLY

(75) Inventors: David S. K. Lee, Salt Lake City, UT (US); John E. Postman, Sandy, UT (US)

(73) Assignee: Varian Medical Systems Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/358,940

(22) Filed: Feb. 5, 2003

(51) Int. Cl.
*H01J 35/10* (2006.01)
*H01J 35/02* (2006.01)

(52) U.S. Cl. ...................... 378/132; 378/121
(58) Field of Classification Search ........... 378/121, 378/123, 125, 131, 132, 133
See application file for complete search history.

(56) References Cited

U.S. PATENT DOCUMENTS

| | | | |
|---|---|---|---|
| 4,071,768 A | 1/1978 | Goodenough | |
| 4,162,420 A | 7/1979 | Grady | |
| 4,167,671 A | 9/1979 | Boden et al. | |
| 4,322,624 A | 3/1982 | Cornelissen et al. | |
| 4,577,340 A * | 3/1986 | Carlson et al. | 378/132 |
| 4,625,324 A | 11/1986 | Blaskis et al. | |
| 4,944,748 A * | 7/1990 | Bramm et al. | 623/3.14 |
| 4,980,896 A | 12/1990 | Forsyth et al. | |
| 5,077,781 A | 12/1991 | Iversen | |
| 5,117,448 A * | 5/1992 | Penato et al. | 378/132 |
| 5,200,985 A * | 4/1993 | Miller | 378/135 |
| 5,340,122 A | 8/1994 | Toboni et al. | |
| 5,357,552 A | 10/1994 | Kutschera | |
| 5,509,045 A * | 4/1996 | Kautz | 378/123 |
| 5,541,975 A * | 7/1996 | Anderson et al. | 378/130 |
| 5,592,526 A | 1/1997 | Daikoku et al. | |
| 5,668,849 A | 9/1997 | Sigiura et al. | |
| 5,701,008 A * | 12/1997 | Ray et al. | 250/352 |
| 5,781,843 A * | 7/1998 | Anderson et al. | 419/29 |
| 5,991,361 A | 11/1999 | Bhatt | |
| 5,995,584 A * | 11/1999 | Bhatt | 378/125 |
| 6,480,571 B1 * | 11/2002 | Andrews | 378/131 |
| 6,558,042 B1 * | 5/2003 | Tompkins | 384/133 |
| 6,570,960 B1 * | 5/2003 | Kuzniar et al. | 378/125 |
| 6,751,292 B2 * | 6/2004 | Andrews et al. | 378/132 |
| 6,879,662 B2 * | 4/2005 | Blin et al. | 378/137 |

FOREIGN PATENT DOCUMENTS

| | | |
|---|---|---|
| JP | 361082643 A | 4/1986 |
| JP | 403208243 A | 9/1991 |

* cited by examiner

*Primary Examiner*—Allen C. Ho
(74) *Attorney, Agent, or Firm*—Workman Nydegger

(57) ABSTRACT

A bearing assembly suitable for use in conjunction with x-ray device having a rotating target anode and electron source disposed in an evacuated enclosure. The bearing assembly includes a shaft having a rotor hub to which the anode is mounted. The shaft cooperates with front and rear bearing rings to define front and rear races, and a spacer facilitates positioning of the bearing rings. Front and rear ball sets are confined in the front and rear races, respectively. A bearing housing receives the bearing rings, spacer, front and rear ball sets, and part of the shaft. Finally, a magnet is disposed near the front bearing ring to prevent escape of foreign matter from the bearings and to prevent ingress of foreign matter to the bearings. Consequently, the magnet serves to extend the life of the bearings and to prevent foreign matter related arcing of the target anode and electron source.

9 Claims, 5 Drawing Sheets

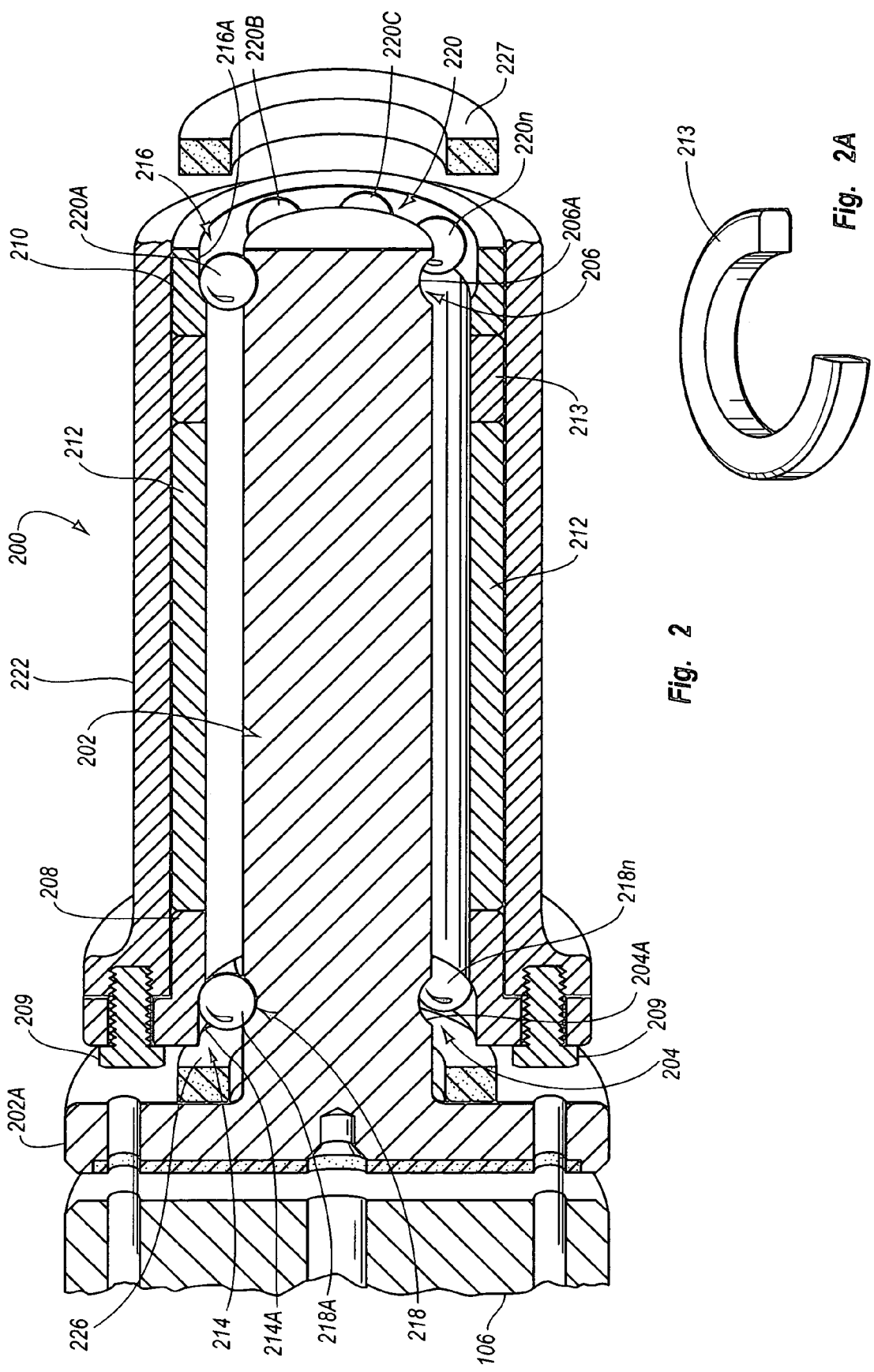

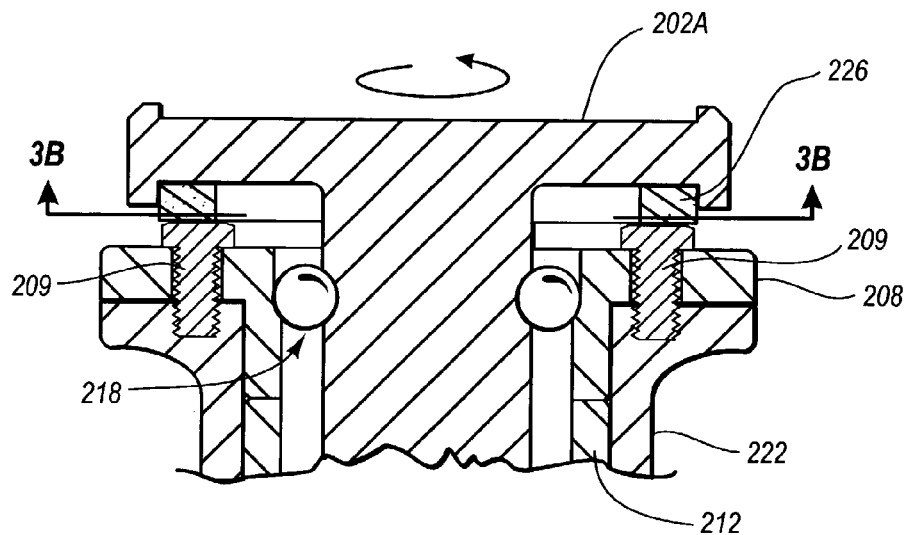
*Fig. 3A*
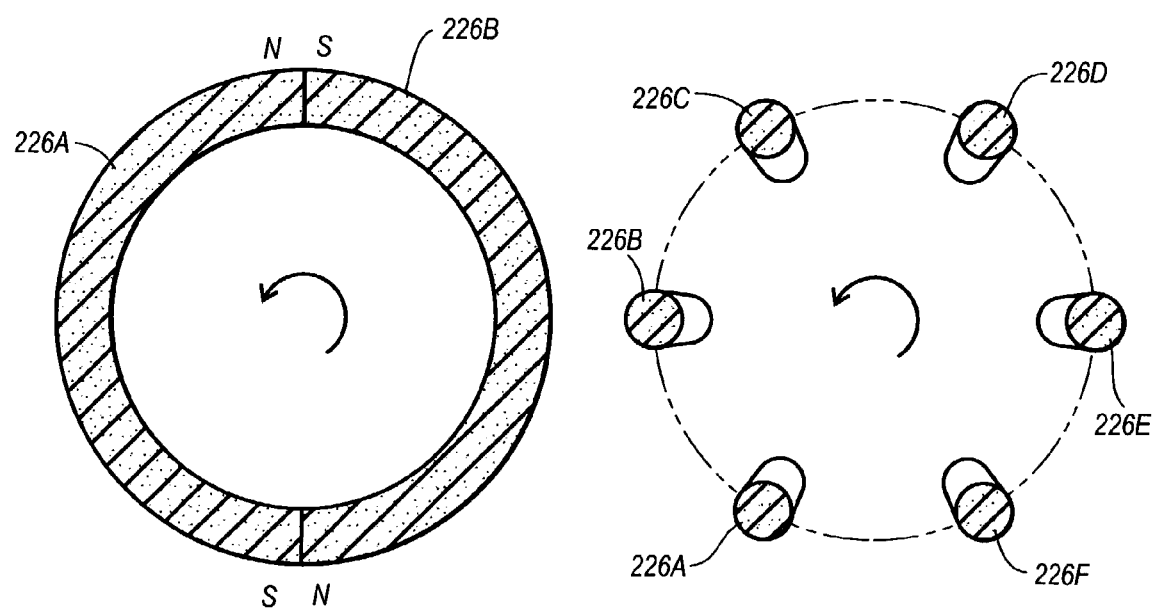
*Fig. 3B*  *Fig. 3C*

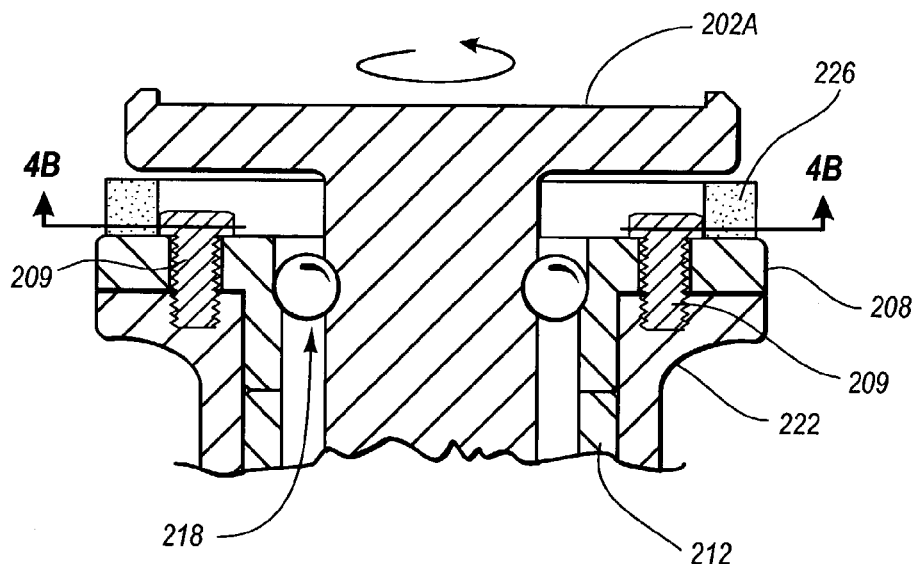
*Fig. 4A*
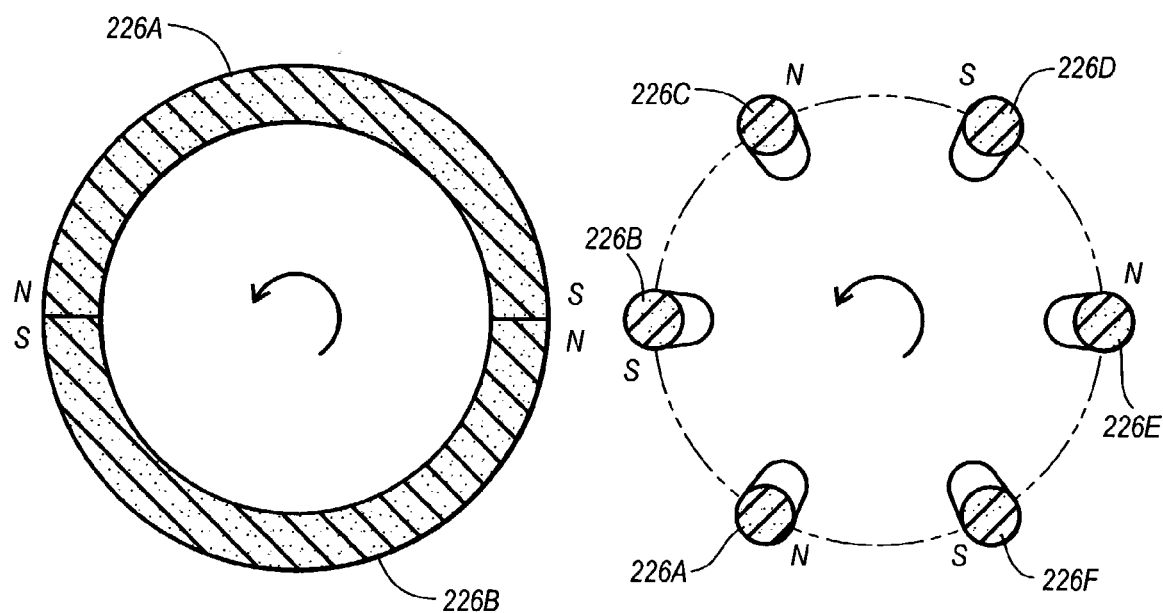
*Fig. 4B*  *Fig. 4C*

BEARING ASSEMBLY

CROSS-REFERENCE TO RELATED APPLICATIONS

Not applicable.

BACKGROUND OF THE INVENTION

1. The Field of the Invention

The present invention relates generally to systems and devices that include at least one component rotatably supported by a bearing assembly. More particularly, embodiments of the present invention relate to bearing assemblies that include various features directed to controlling ingress and egress of foreign matter to and from, respectively, the bearing assembly, and which thereby materially reduce the incidence of foreign matter related problems in the bearing assembly, as well as in the system or device wherein the bearing assembly is employed.

2. Related Technology

X-ray producing devices are valuable tools that are used in a wide variety of industrial, medical, and other applications. For example, such equipment is commonly used in areas such as diagnostic and therapeutic radiology, semiconductor manufacture and fabrication, and materials analysis and testing. While they are used in various different applications, the different x-ray devices share the same underlying operational principles. In general, x-rays, or x-ray radiation, are produced when electrons are produced, accelerated, and then impinged upon a material of a particular composition.

Typically, these processes are carried out within a vacuum enclosure. Disposed within the vacuum enclosure is an electron source, or cathode, and a target anode, which is spaced apart from the cathode. In operation, electrical power is applied to a filament portion of the cathode, which causes a stream of electrons to be emitted by the process of thermionic emission. A high voltage potential applied across the anode and the cathode causes the electrons emitted from the cathode to rapidly accelerate towards a target surface, or focal track, positioned on the anode.

The accelerating electrons in the stream strike the target surface, typically a refractory metal having a high atomic number, at a high velocity and a portion of the kinetic energy of the striking electron stream is converted to electromagnetic waves of very high frequency, or x-rays. The resulting x-rays emanate from the target surface, and are then collimated through a window formed in the x-ray tube for penetration into an object, such as the body of a patient. As is well known, the x-rays can be used for therapeutic treatment, or for x-ray medical diagnostic examination or material analysis procedures.

The aforementioned scheme for the production of x-rays is relatively inefficient. It is generally acknowledged that in typical x-ray tube operations, only about one percent of the energy contained in the beam of electrons produced by the electron source results in x-ray emissions from the target surface. A substantial portion of the remaining energy of the electron beam is imparted to the x-ray device and its component structures, such as the anode, in the form of heat. In general, the quality and resolution of images produced by an x-ray device increases in relation to, among other things, the power associated with the electron beam. Thus, improvements in image quality have often come at the cost of a relative increase in x-ray tube operating temperatures. Various approaches have been devised to deal with such increases in operating temperatures.

X-ray tubes that employ rotating anodes represent one approach that has been successful in managing the high heat levels characteristic of many x-ray devices. In a typical rotating anode type x-ray tube, the anode is rotatably supported by a bearing assembly. A stator serves to rotate the shaft, and the anode accordingly rotates as well. As the anode rotates, each point on the focal track is rotated into and out of the path of the electron beam generated by the cathode. In this way, the electron beam is in contact with a given point on the focal track for only short periods of time, thereby allowing the remaining portion of the focal track to cool during the time that it takes such given portion to rotate back into the path of the electron beam.

As suggested above, the bearing assembly with which the shaft is rotatably supported is central to the operation of such rotating anode type x-ray devices. However, many known bearing assemblies and associated components present problems which often act to materially impair the safety, effectiveness and reliability of the x-ray device. In particular, the design, assembly, and operation of typical bearing assemblies are such that many known bearing assemblies often become contaminated by particles which create various problems with respect to the operation of the x-ray tube.

One example of problems caused by the presence of particles in the x-ray tube relates to the high voltage across the cathode and anode. In general, the presence of such particles in the x-ray tube causes the high potential across the cathode and anode to become unstable. This lack of high voltage stability causes discharges of electricity, or arcs, between the cathode and anode. High voltage arcs may cause damage to the target surface of the anode, as well as to the cathode. Further, such high voltage arcs may compromise image quality through the generation of x-ray image artifacts.

Another problem associated with the presence of particles in the x-ray tube relates to the operation of the bearing assembly. In particular, when such particles enter, or are created in, the bearings, the particles tend to stick between the balls, creating rough surfaces inside the bearing. As the balls pass over the rough surfaces thus created, noise is generated within the x-ray device. Such noise is distracting to the operator. Further, such noise can be unsettling to a patient, particularly in applications such as mammography where the patient is in intimate contact with the x-ray machine. Finally, the rough surfaces created by the particles may serve to reduce the operating life of the bearings.

There are a variety of mechanisms by which foreign matter contamination of the x-ray tube may occur. As suggested above, at least some of such mechanisms concern the design, assembly, and operation of bearing assemblies. For example, many known bearing assemblies employ balls and/or races which are designed to include a solid lubricant such as silver (Ag), lead (Pb), or molybdenum disulfide ($MoS_2$). Generally, such metal lubricants are employed in x-ray devices at least because they are better suited to the extreme operating temperatures of an x-ray tube than are typical hydrocarbon-based lubricants. These solid lubricants are applied to the balls and/or races by various chemical or physical methods such as electroplating, ion plating, sputtering, and evaporation. While the coating process is controlled in an effort to ensure uniformity and adherence of the coating, the motion of the balls rolling along the races causes the metal lubricant to move around somewhat and form lumps. Such lumps of lubricant are often as large as a few thousandths of an inch thick, and may be as long as one eighth of an inch.

As the lumps of lubricant are formed in the bearing assembly, they additionally pick up various elements, such as iron (Fe) and nickel (Ni), from the balls and races of the bearing assembly. As a result of the presence of the iron, the lumps of lubricant typically exhibit magnetic properties. Typically, these other elements migrate to the lubricant as a result of processes such as solid state diffusion, and abrasion. As the lubricant becomes contaminated with such elements, the desirable properties of the lubricant are compromised. For example, the ability of the lubricant to adhere to the balls and races is impaired, and the lubricant thus tends to separate from the balls and races and is then able to move about within the x-ray tube. As discussed above, problems caused by the loose lubricant particles include arcing between the cathode and anode, creation of noise in the bearing assembly, and a shortening of the life of the bearing assembly and its components.

Yet another vehicle by which foreign matter contaminates the x-ray tube relates to the processes by which the bearing assembly is put together. Typically, when bearing assembly components are inserted into the bearing housing during assembly, the bearing assembly components tend to rub against the sides of the housing. As a result of this abrasion, metal particles are often produced within the bearing assembly. Also, many bearing assemblies contain threaded holes and threaded fasteners to hold the various parts of the assembly. Pieces of metal can come loose during assembly. Because the various components of the bearing assembly are often constructed of various steel alloys, the particles thus produced typically exhibit magnetic properties. As discussed above, the presence of such particles in the x-ray tube is problematic for a variety of reasons, and may contribute to problems such as arcing, reduced bearing life, and noise generation within the x-ray device.

Finally, at least one other mechanism by which foreign matter enters the x-ray tube relates to the design of the bearing housing of the bearing assembly. In particular, the bearing housing in typical x-ray tube designs is at least partially open at the end through which the bearings and shaft are inserted. Thus, there is little to prevent foreign matter present in, or created in, the bearing assembly, from escaping into other areas of the x-ray tube. Correspondingly, the open end of the bearing housing allows foreign matter present in other parts of the x-ray tube to enter the bearings.

At least one attempt has been made to resolve the aforementioned problems and shortcomings by employing mesh, or a screen, intended to prevent foreign matter from escaping the bearing assembly. The approach represented by such screens and meshes is problematic however. For example, while such screens and meshes may be somewhat effective in confining foreign matter within the bearing assembly, they are generally ineffective in preventing the movement of the foreign matter about the interior of the bearing assembly. As discussed above, foreign matter present in, or generated in, the bearing assembly implicates a variety of undesirable consequences.

In particular, foreign matter in the bearing assembly may compromise the operation of the bearings by impairing the integrity of the bearing lubricant. As another example, the presence of foreign matter in the bearing assembly may contribute to increased noise levels in the x-ray device. Thus, the inability of screens, meshes, or similar approaches, to control the foreign matter present or created in the bearing assembly represents a significant limitation in this attempt to resolve the problems in the art.

Another limitation of known particle control methods and devices such as meshes, screens, and the like is that they are incapable of effectively controlling those particles located outside of the bearing assembly. In the x-ray tube environment, at least, this is a significant limitation because such particles, if not reliably controlled, may contribute to arcing of the anode and cathode.

In view of the foregoing problems, and others, it would be an advancement in the art to provide improved devices and systems for trapping and controlling foreign matter present in, or created in, an x-ray tube.

BRIEF SUMMARY OF VARIOUS FEATURES OF THE INVENTION

The present invention has been developed in response to the current state of the art, and in particular, in response to these and other problems and needs that have not been fully or adequately resolved by currently available bearing assemblies. Briefly summarized, embodiments of the present invention provide a bearing assembly which includes features directed toward facilitating improved control of foreign matter generated or present within, or without, the bearing assembly.

Embodiments of the present invention are particularly well suited for use in the context of rotating anode type x-ray tubes. However, it will be appreciated that embodiments of the present invention may be suitable for use in any device where it is desired to effectively and reliably control foreign matter so as to prevent damage to the bearing assembly and/or to the device.

In one embodiment of the invention, a bearing assembly for a rotating anode x-ray tube is provided that includes a shaft having a rotor hub, to which the anode is mounted, and defining front and rear inner races. Disposed about the shaft are front and rear bearing rings, separated by a spacer, which define, respectively, front and rear outer races. The front and rear outer races, respectively, defined by the front and rear bearing rings, cooperate with the front and rear inner races, defined by the shaft, to confine front and rear ball sets which each comprise a plurality of balls coated with a solid metal lubricant, preferably lead, silver, or molybdenum disulfide. The front and rear bearing rings, spacers, and a portion of the shaft, are secured within a bearing housing. Finally, the bearing assembly includes one or more magnets disposed proximate to the front inner and outer races.

In operation, a stator imparts energy to the shaft, causing the shaft to rotate at high speed. As the shaft rotates, the balls in the front and rear ball sets travel along the front and rear races, respectively. Motion of the balls along the races causes some of the solid metal lubricant to clump on the balls and/or races. Ultimately, the clumps thus formed pick up foreign particles comprising elements such as iron (Fe) and nickel (Ni) from the balls and the races. Typically, such foreign particles find their way into the lubricant by way of processes such as solid state diffusion, or abrasion of the balls and/or races. Such foreign particles compromise the ability of the solid metal lubricant to adhere to the balls and races. Consequently, some of the lubricant separates from the balls and races. Because the separated lubricant includes elements such as iron, the lubricant particles exhibit magnetic properties. Because the particles are magnetic, the magnets of the bearing assembly are able to attract and retain such particles, thereby preventing them from, among other things, impairing the operation of the bearings, or causing high voltage arcs within the x-ray tube.

These and other features and advantages of the present invention will become more fully apparent from the following description and appended claims.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 2 is a section view of an embodiment of a bearing assembly;

FIG. 3A is a section view of an embodiment of a bearing assembly illustrating an exemplary arrangement wherein a magnet is attached to the rotor hub;

FIG. 3B is a section view taken along Line 3B of FIG. 3A, illustrating an exemplary magnet arrangement wherein a split magnet (or one-piece magnet) is attached to the rotor hub;

FIG. 3C is a section view illustrating an alternative to the split magnet arrangement illustrated in FIG. 3B, wherein the alternative arrangement includes a plurality of individual magnets attached to the rotor hub;

FIG. 4A is a section view of an embodiment of a bearing assembly illustrating an exemplary magnet arrangement wherein a single magnet is attached to the bearing housing;

FIG. 4B is a section view of an embodiment of a bearing assembly illustrating an exemplary magnet arrangement wherein a plurality of magnets are attached to the bearing housing;

FIG. 4C is a section view illustrating an alternative to the split magnet arrangement illustrated in FIG. 4B, wherein the alternative arrangement includes a plurality of individual magnets attached to the bearing housing.

DETAILED DESCRIPTION OF VARIOUS EMBODIMENTS OF THE INVENTION

Reference will now be made to figures wherein like structures will be provided with like reference designations. It is to be understood that the drawings are diagrammatic and schematic representations of various embodiments of the invention, and are not to be construed as limiting the present invention, nor are the drawings necessarily drawn to scale.

Figure 1:
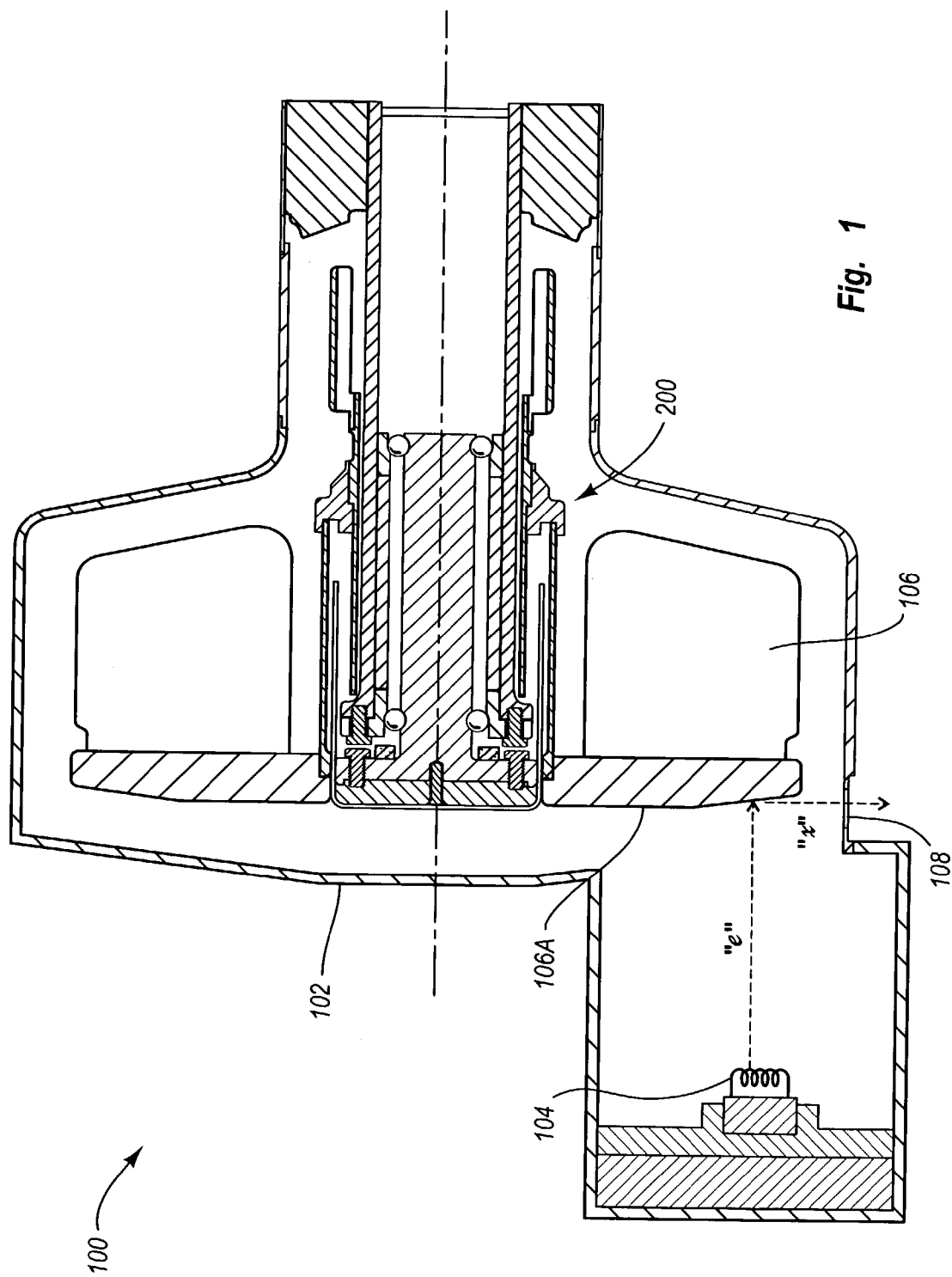
FIG. 1 is a side view illustrating various features of an embodiment of an x-ray tube.

Reference is first made to FIG. 1, wherein an x-ray tube is indicated generally at 100. It will be appreciated that the x-rays produced by x-ray tube 100 may be employed in any of a variety of applications, and embodiments of the present invention should accordingly not be construed to be limited to any particular field of application.

As indicated in the illustrated embodiment, x-ray tube 100 includes a vacuum enclosure 102, inside which is disposed an electron source 104, preferably comprising a cathode or the like, and an anode 106 arranged in a spaced-apart configuration with respect to electron source 104 and rotatably supported by bearing assembly 200. Anode 106 further includes a target surface 106A, preferably comprising a refractory metal such as tungsten or the like, arranged so as to receive electrons emitted by electron source 104. The x-rays produced by x-ray tube 100 are directed out of vacuum enclosure 102 by way of a window 108, preferably comprising beryllium or the like.

With continuing attention to FIG. 1, details are provided regarding various operational features of x-ray tube 100. In operation, a stator (not shown) causes anode 106 to rotate at high speed. Power applied to electron source 104 causes electrons, denoted at "e" in FIG. 1, to be emitted by thermionic emission and a high voltage potential applied across electron source 104 and anode 106 causes the emitted electrons "e" to rapidly accelerate from electron source 104 toward anode 106. Upon reaching anode 106, electrons "e" strike target surface 106A causing x-rays, denoted at "x" in FIG. 1 to be produced. The x-rays "x" are then collimated and passed through window 108 and into a subject, for example, the body of a patient.

Directing attention now to FIG. 2, and with continuing reference to FIG. 1, various details are provided regarding an embodiment of a bearing assembly 200. In particular, bearing assembly 200 includes a shaft 202, preferably comprising high temperature tool steel or the like, having rotor hub 202A and defining front and rear inner races, 204 and 206, respectively, disposed circumferentially about shaft 202. Front and rear inner races 204 and 206, in turn, include respective bearing surfaces 204A and 206A. While shaft 202 preferably comprises high temperature tool steel, it will be appreciated that various other materials may be employed consistent with a desired application.

In at least one embodiment of the invention, portions of front and rear inner races 204 and 206, preferably at least bearing surfaces 204A and 206A, are coated with a solid metal lubricant such as lead (Pb), silver (Ag), molybdenum disulfide ($MoS_2$), or other suitable material. It will be appreciated however, that while lead and silver lubricants are particularly well suited to x-ray tube environments, different lubricants may be employed when bearing assembly 200 is used in other environments. For example, in relatively low temperature applications, hydrocarbon-based lubricants such as oil and the like may be employed.

With continuing reference to FIG. 2, bearing assembly 200 additionally includes front and rear bearing rings 208 and 210 respectively, disposed about shaft 202 and separated by a spacer. While other spacer arrangements could be used, in the illustrated example a tubular spacer 212 is used in combination with a "C"-shaped spacer 213, which is also shown in FIG. 2A. In particular, the opening of the "C"-shaped spacer is large enough to pass the shaft 202 diameter. Front and rear bearing rings 208 and 210 define front and rear outer races 214 and 216, respectively, which in turn, include respective bearing surfaces 214A and 216A. In at least one embodiment of the invention, portions of front and rear outer races 214 and 216, preferably at least bearing surfaces 214A and 216A, are coated with a solid metal lubricant such as lead (Pb), silver (Ag), molybdenum disulfide ($MoS_2$), or other suitable material. As in the case of shaft 202, front and rear bearing rings 208 and 210, and spacers 212 and 213, preferably comprise high temperature tool steel or the like. However, it will be appreciated that various other materials may be employed consistent with a desired application.

With more specific reference now to front and rear bearing rings 208 and 210, and spacers 212 and 213, additional details are provided regarding the arrangement of such components with respect to shaft 202. In particular, front bearing ring 208, rear bearing ring 210, as well as spacers 212 and 213, are disposed about shaft 202 so that front outer race 214 and rear outer race 216 are substantially aligned with, respectively, front inner race 204 and rear inner race 206 defined by shaft 202. In this way, front outer race 214 and rear outer race 216 cooperate with, respectively, front inner race 204 and rear inner race 206 to confine a front ball set 218 and a rear ball set 220, respectively. Both front ball set 218 and a rear ball set 220 comprise respective pluralities of balls 218A ... 218n and 220A ... 220n. In general, front ball set 218 and a rear ball set 220 cooperate to facilitate high speed rotary motion of shaft 202, and thus anode 106.

It will be appreciated that the variables such as the number and diameter of balls 218A ... 218n and 220A ... 220n may be varied as required to suit a particular application. Further, in some embodiments of the invention, balls 218A ... 218n and 220A ... 220n are coated with a solid metal lubricant such as lead (Pb), silver (Ag), molybdenum disulfide ($MoS_2$), or other suitable material.

Directing continuing attention to FIG. 2, bearing assembly 200 includes bearing housing 222 which serves to receive and securely retain front and rear bearing rings 208 and 210, as well as shaft 202. Preferably, bearing housing 222 is substantially in the shape of a seamless hollow cylinder and preferably comprises a durable, high strength metal or metal alloy, such as stainless steel or the like, that is suitable for use in high temperature x-ray tube operating environments. In one embodiment, a plurality of bolts 209 serve to attach front bearing ring 208 to bearing housing 222, thereby retaining rear bearing ring 210, spacers 212 and 213, and shaft 202 in position within bearing housing 222. It will be appreciated however, that various other fasteners may likewise be employed. Further, such fasteners may be eliminated and one or more of the aforementioned components attached to housing 222 by way of processes including, but not limited to, welding and brazing.

The positioning of bearing rings 208 and 210, as well as shaft 202, within bearing housing 222 is facilitated by the spacers 212 and 213 together, which serve to, among other things, properly orient front and rear bearing rings 208 and 210 with respect to shaft 202. Spacers 212 and 213, front and rear bearing rings 208 and 210, and shaft 202 are securely retained in bearing housing 222 by way of fasteners 209 which secure front bearing ring 208 to bearing housing 222, thereby substantially foreclosing axial movement of spacers 212 and 213 and front and rear bearing rings 208 and 210.

In the illustrated example, the bearing assembly 222 includes one or more magnets 226, preferably permanent magnets, disposed in various locations, for example, proximate to front inner race 204 and front outer race 214. In at least some embodiments, one or more magnets 227 are disposed proximate rear inner race 206 and rear outer race 216. In general, the disclosure herein concerning magnets 226 is germane as well to magnet(s) 227. Respecting magnet (s) 226, it will be appreciated that magnet(s) 226 comprise one exemplary structure which serves as a means for controlling foreign matter, and that various other structures may alternatively be employed to provide such functionality.

For example, magnetized structures such as meshes and screens may alternatively be employed as means for controlling foreign matter. Likewise, such a means for controlling foreign matter includes within its purview structures other than permanent magnets, such as electromagnets. In view of the foregoing, it should be understood that such structural configurations are presented herein solely by way of example and should not be construed as limiting the scope of the present invention in any way.

Finally, it should be noted that while the following discussion concerning various magnet materials, and devices and methods for attachment of such magnets, is presented in the context of FIG. 2, such discussion is equally germane to the various other embodiments contemplated hereby.

In the illustrated embodiment, magnet 226 is attached to the underside of rotor hub 202A. It will be appreciated that in cases where rotor hub 202A comprises a magnetic material such as 400 series stainless steel, too steel, CSM Rex-20 (manufactured by Crucible Specialty Metals, Co.), or the like, magnet 226 may be retained in place simply by the natural magnetic attraction between magnet 226 and rotor hub 202A. However, in the event rotor hub 202A is composed of a non-magnetic metal alloy, such as the non-magnetic nickel-chromium-iron (NiCrFe) alloys sold under the trademark INCONEL® 718 (manufactured by INCO ALLOYS), magnet 226 is preferably attached to rotor hub 202A by fasteners, examples of which include pins, screws, snap rings, or the like, or by crimping into place. Note that depending on the composition of magnet 226, the magnet 226 may preferably be affixed to the rotor hub 202A with such fastening schemes even where the hub is comprised of a magnetic material. This will insure proper attachment, even if the magnet is exposed to high temperatures that could affect its magnetism.

While the illustrated embodiment indicates a single magnet 226 attached to rotor hub 202A, it will be appreciated that, as discussed below in the context of FIGS. 3A through 4C, one or more magnets 226 may be placed in additional or alternative locations and arrangements as well. Generally however, embodiments of the present invention comprise one or more magnets 226 positioned so that magnetic particles produced in bearing assembly 200 and/or other portions of x-ray tube 100 can freely travel, under the influence of such attraction and/or the influence of forces such as gravitational force, to magnet(s) 226 and be reliably retained thereby.

As suggested earlier, at least some embodiments of bearing assembly 200 are well suited for use in x-ray tube environments. It will accordingly be appreciated that, when used in such environments, magnet 226 preferably comprises a refractory, or rare earth, magnet that retains adequate magnetic properties even when exposed to extreme heat. Magnet materials contemplated as being within the scope of the present invention include, but are not limited to, rare earth alloys such as samarium-cobalt (e.g., $SmCo_5$ (1-5 samarium-cobalt), $Sm_2Co_{17}$ (2-17 samarium-cobalt)) having a Curie temperature between about 700° C. and about 800° C., and possessing a magnetic energy product, at x-ray tube operating temperatures, of about 80 kJ/m$^3$. It will be appreciated however, that the material(s) used for magnet 226 may be varied as required so that the properties of the magnet suit the particular desired application. For example, where embodiments of bearing assembly 200 are employed in relatively low temperature applications, rare earth neodymium-iron-boron (NdFeB) magnets may be used.

In addition to magnet(s) 226, or as an alternative thereto, various portions of bearing assembly 200 may include, or substantially comprise, suitable magnetic materials. For example, in one alternative embodiment of the invention, at least a portion of spacer 212 is magnetized and spacer 212 is thus effective in attracting and retaining at least some of the foreign matter produced, or present in, bearing assembly 200. In view of the foregoing, it will be appreciated that the scope of the present invention should not be construed to be limited solely to the illustrated embodiments.

Directing continuing attention to FIG. 2, details are provided regarding various operational aspects of embodiments of the present invention. Note that while the following discussion is presented in the context of FIG. 2, such discussion is similarly germane to the various other embodiments contemplated hereby.

In general, rotation of shaft 202 causes front ball set 218 and rear ball set 220 to travel at high speed along the races cooperatively defined by shaft 202 and front and rear bearing rings 208 and 210. As front ball set 218 and rear ball set 220 travel along the races, lubricant present on front ball set 218 and rear ball set 220, and/or front and rear inner races 204 and 206 and front and rear outer races 214 and 216, tends to aggregate and form clumps within bearing assembly 200. By processes such as abrasion of front ball set 218 and rear ball set 220, and/or front and rear inner races 204 and 206 and front and rear outer races 214 and 216, and/or the process of solid state diffusion, such clumps entrap bearing assembly component materials such as iron (Fe) and nickel (Ni), thereby rendering the clumps, or particles, magnetic.

In addition to lending magnetic properties to the lubricant, bearing component materials such as iron and nickel also compromise the ability of the lubricant to adhere to the surface to which the lubricant was initially applied. Consequently, the magnetic lubricant particles tend to separate from the lubricant coated surfaces and move about within bearing assembly 200, as well as within the device wherein bearing assembly 200 is disposed. As a result of the magnetic field produced by magnet 226, magnet 226 effectively and reliably attracts and retains such loose particles.

In view of the foregoing discussion, it will be appreciated that embodiments of the present invention serve to, among other things, substantially foreclose many of the various problems ascribed to the presence of foreign matter in bearing assemblies and x-ray tubes. By way of example, it was previously noted that foreign matter present in bearing assembly 200 may, among other things, compromise the operation of bearing assembly 200 by creating rough spots in the races which contribute to increased noise levels in bearing assembly 200 and shortened operational life of bearing assembly 200 and its constituent components.

In this regard, at least, it will be appreciated that embodiments of the present invention present at least a twofold benefit with respect to the operation of bearing assembly 200. In particular, magnets 226 not only attract and retain particles created in, or present in, bearing assembly 200, but such magnets are also effective in attracting and retaining magnetic particles outside of bearing assembly 200 before such magnetic particles can make their way into bearing assembly 200.

Thus, embodiments of the present invention represent a material improvement over known particle control methods and devices, such as meshes and screens, at least because such known particle control methods and devices are generally incapable of removing harmful particles, already present, or created in, bearing assembly 200, which may serve to compromise the safe and reliable operation of bearing assembly 200. Known particle control methods and devices are likewise incapable of attracting and retaining those particles located outside of bearing assembly 200. As suggested below, this represents a significant limitation.

It will be appreciated that embodiments of bearing assembly 200 provide additional benefits and features when employed in the context of x-ray tubes. For example, magnet(s) 226 serve to attract and retain particles present, or created within, bearing assembly 200, as well as attracting and retaining particles present located elsewhere in x-ray tube 100. Consequently, embodiments of the present invention facilitate, among other things, the safe, effective, and reliable operation of x-ray tube 100 by attracting and securely retaining particles that, left unchecked, would otherwise contribute to the occurrence of undesirable effects such as high voltage arcing inside x-ray tube 100. By reducing or eliminating the likelihood of high voltage arcing, embodiments of the present invention thereby serve to improve the safety and reliability of x-ray tube 100, as well as extend the life of components including, but not limited to, electron source 104 and anode 106, and thus contribute to a relative increase in the operational life of x-ray tube 100 as a whole.

In this regard at least, the "active" approach represented by embodiments of the present invention represent an advancement in the art over more "passive" approaches such as screens, meshes and the like which passively confine particles within a predefined area, but which are incapable of actively attracting and retaining particles, wherever located, that could prove detrimental to the operation of bearing assembly 200 and/or the device within which such bearing assembly 200 is employed.

As suggested above, the present invention contemplates as within its scope a variety of magnet configurations and arrangements. Accordingly, attention is directed now to FIGS. 3A through 3C where details are provided regarding exemplary configurations and arrangements of magnet(s) 226. With respect to embodiments contemplated by the present invention, it will be appreciated that regardless of the magnet arrangement employed, magnet(s) 226 should generally be arranged symmetrically about the axis of rotation of shaft 202 (and thus, the axis of rotation of target anode 106) so as to foreclose unbalanced rotation, and attendant vibration, of shaft 202 that could impair the operation of bearing assembly 200 and x-ray tube 100.

Directing particular attention now to FIGS. 3A and 3B, a two piece split magnet 226, preferably substantially circular in shape, is provided which comprises first magnet portion 226A and second magnet portion 226B, each of which is attached to the underside of rotor hub 202A and is thereby positioned to attract and reliably retain magnetic particles produced in bearing assembly 200 and/or other portions of x-ray tube 100. Preferably, first magnet portion 226A and second magnet portion 226B are arranged so that the south pole of one magnet is adjacent the north pole of the other magnet. Such an arrangement enhances the strength of the magnetic field produced by first magnet portion 226A and second magnet portion 226B, and thereby improves the overall effectiveness of such magnets in attracting and retaining magnetic particles.

As suggested in FIG. 3C, the present invention also contemplates as within its scope configurations employing a plurality of magnets disposed in various arrangements. In the illustrated embodiment, a total of six magnets, 226A through 226F, each being preferably cylindrical in shape, are equally spaced about the underside of rotor hub 202A. Finally, while not specifically illustrated, it will be appreciated that in an alternative embodiment, a cylindrical magnet 226, comprising one or more segments, may be attached about shaft 202, proximate front bearing ring 208, so as to reliably attract and retain particles present, or generated, within or without bearing assembly 200.

Directing attention now to FIGS. 4A through 4C, details regarding various other exemplary configurations and arrangements of magnet(s) 226 are provided. In the illustrated embodiments, one or more magnet(s) 226 are attached to bearing housing 222 of bearing assembly 200, proximate front bearing ring 208. As in the case of the various embodiments illustrated in FIGS. 3A and 3B, it will be appreciated that magnet(s) 226 may comprise a single magnet having one or more constituent portions, or alternatively, a plurality of smaller magnets arranged in a desired configuration, such as magnets 226A through 226F (FIG. 4C). Finally, magnet(s) 226 may, as in the case of other embodiments contemplated hereby, be attached to bearing housing 222 by magnetic attraction or, if required, by various types of fasteners, such as crimping them in place or by metallurgical bonding, such as brazing.

Figure 5:
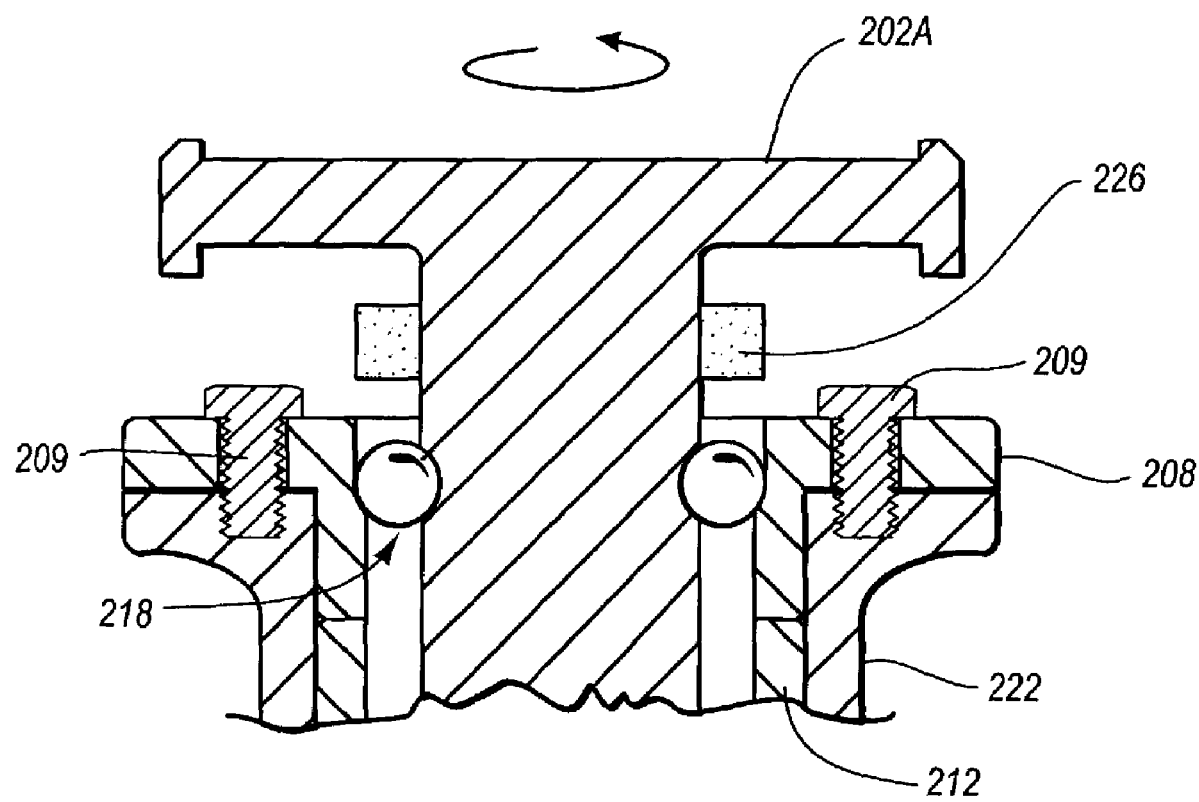
FIG. 5 is a section view illustrating an alternative arrangement wherein one or more magnets are attached to, and disposed about, the shaft of the bearing assembly.

Finally, directing attention to FIG. 5, yet another alternative embodiment is indicated. In particular, one or more magnet(s) 226 are disposed about the circumference of shaft 202. Magnet(s) 206 are thus well positioned to attract and retain foreign matter present or created in bearing assembly 200, as well as foreign matter outside of bearing assembly 200.

It will be appreciated that in view of the discussion presented herein, embodiments of the present invention provide for considerable latitude regarding aspects such as the design and employment of magnet(s) 226. For example, it will be appreciated that variables pertaining to magnet(s) 226 including, but not limited to, size, number, location, positioning, geometry, orientation of magnetic polarization, magnetic strength, composition, and the like may be varied either alone or in various combinations as required to suit a particular application and/or to facilitate achievement of one or more desired results. Accordingly, the embodiments of the invention discussed and illustrated herein are exemplary only and should not be construed to limit the scope of the present invention in any way.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An x-ray device, comprising:
    (a) an evacuated housing;
    (b) an electron source and a target anode disposed within said evacuated housing, said target anode positioned to receive electrons emitted by said electron source; and
    (c) a bearing assembly rotatably supporting said target anode and substantially disposed within said evacuated housing, said bearing assembly including front and rear bearing rings confining respective front and rear ball sets, and said bearing assembly further including a first magnet located so that an open path is defined at least between said front bearing ring and said first magnet wherein said first magnet is interposed between said target anode and said front bearing ring, and said bearing assembly further including a second magnet located so that an open path is defined at least between said rear bearing ring and said second magnet.

2. The x-ray device as recited in claim 1, wherein at least one magnet is disposed about an axis of rotation of said target anode.

3. The x-ray device as recited in claim 1, wherein at least one magnet substantially comprises a rare earth alloy.

4. The x-ray device as recited in claim 3, wherein said rare earth alloy comprises a samarium-cobalt alloy.

5. The x-ray device as recited in claim 1, wherein the bearing assembly further comprises a shaft to which the target anode is attached, the shaft defining respective front and rear inner races in contact with the front and rear ball sets, respectively.

6. The x-ray device as recited in claim 5, wherein the shaft includes a rotor hub to which at least one of the magnets is attached.

7. The x-ray device as recited in claim 1, wherein at least one portion of the bearing assembly is magnetized.

8. The x-ray device as recited in claim 1, wherein an open path is defined between the anode and the front bearing ring.

9. An x-ray device, comprising:
    (a) an evacuated envelope housing;
    (b) an electron source and a target anode disposed within said evacuated housing, said target anode positioned to receive electrons emitted by said electron source; and
    (c) a bearing assembly rotatably supporting said target anode and substantially disposed within said evacuated housing, said bearing assembly including front and rear bearing rings confining respective front and rear ball sets, and said bearing assembly further including a plurality of magnets located so that an open path is defined at least between said front bearing ring and said plurality of magnets, said plurality of magnets being interposed between said target anode and said front bearing ring.

* * * * *

UNITED STATES PATENT AND TRADEMARK OFFICE
CERTIFICATE OF CORRECTION

PATENT NO.         : 7,343,002 B1
APPLICATION NO.    : 10/358940
DATED              : March 11, 2008
INVENTOR(S)        : Lee et al.

It is certified that error appears in the above-identified patent and that said Letters Patent is hereby corrected as shown below:

Column 8
Line 15, change "too steel" to --tool steel--

Column 11
Line 22, change "Magnet(s) 206" to --Magnet(s) 226--

Signed and Sealed this

Ninth Day of November, 2010

David J. Kappos
*Director of the United States Patent and Trademark Office*